United States Patent
Loevsky et al.

(10) Patent No.: US 10,352,766 B1
(45) Date of Patent: Jul. 16, 2019

(54) FOCUSING MODULES AND METHODS

(71) Applicant: KLA-Tencor Corporation, Milpitas, CA (US)

(72) Inventors: Barry Loevsky, Yokneam Ilit (IL); Ari Krauss, Yehuda (IL); Avraham Bakal, Carmiel (IL)

(73) Assignee: KLA-Tencor Corporation, Milpitas, CA (US)

( * ) Notice: Subject to any disclaimer, the term of this patent is extended or adjusted under 35 U.S.C. 154(b) by 52 days.

(21) Appl. No.: 14/965,464

(22) Filed: Dec. 10, 2015

Related U.S. Application Data

(60) Provisional application No. 62/090,336, filed on Dec. 10, 2014.

(51) Int. Cl.
| | |
|---|---|
| *G01J 1/00* | (2006.01) |
| *G01J 1/42* | (2006.01) |
| *G02F 1/135* | (2006.01) |
| *G02B 26/08* | (2006.01) |
| *G02B 26/04* | (2006.01) |

(52) U.S. Cl.
CPC ............ *G01J 1/4257* (2013.01); *G02B 26/04* (2013.01); *G02B 26/0833* (2013.01); *G02F 1/135* (2013.01)

(58) Field of Classification Search
CPC .... G02B 26/04; G02B 26/0833; G02B 5/005; G03B 17/17; G03B 9/08; H04N 5/2256; G02F 1/00
USPC .......................................................... 356/122
See application file for complete search history.

(56) References Cited

U.S. PATENT DOCUMENTS

| | | | | | |
|---|---|---|---|---|---|
| 4,563,090 | A | * | 1/1986 | Witte | G01J 3/28 356/328 |
| 6,275,623 | B1 | * | 8/2001 | Brophy | G02B 6/12007 385/1 |
| 6,891,791 | B1 | * | 5/2005 | Gutin | G11B 7/1353 369/112.01 |
| 2004/0246474 | A1 | * | 12/2004 | Guetta | G01N 21/8422 356/237.2 |
| 2008/0079819 | A1 | * | 4/2008 | Uchida | H04N 5/23219 348/229.1 |
| 2009/0321520 | A1 | * | 12/2009 | Martenson | G01D 5/24409 235/454 |
| 2013/0188012 | A1 | * | 7/2013 | Bellis | H04N 5/2252 348/42 |
| 2018/0048811 | A1 | * | 2/2018 | Waller | H04N 5/23232 |

OTHER PUBLICATIONS

V.-F. Duma et al. (Optical choppers: modulators and attenuators, Proceedings of SPIE, 2009).*

* cited by examiner

*Primary Examiner* — Sunghee Y Gray
(74) *Attorney, Agent, or Firm* — Suiter Swantz pc llo

(57) ABSTRACT

Focusing modules and methods are provided, which use a spatial light modulator (SLM) configured to yield a circumferentially sinusoidal pattern to derive focusing signals. For example, the SLM may comprise an optical chopper wheel made of a glass disc with a circumferentially sinusoidal pattern. The circumferentially sinusoidal pattern simplifies phase derivation from the focusing signal, providing a faster and more accurate estimation of defocusing. Signal detection may be carried out by a diode array that provides a more accurate signal faster, as well as a more differentiated analysis of the focusing signal than the one available by current technology.

10 Claims, 6 Drawing Sheets

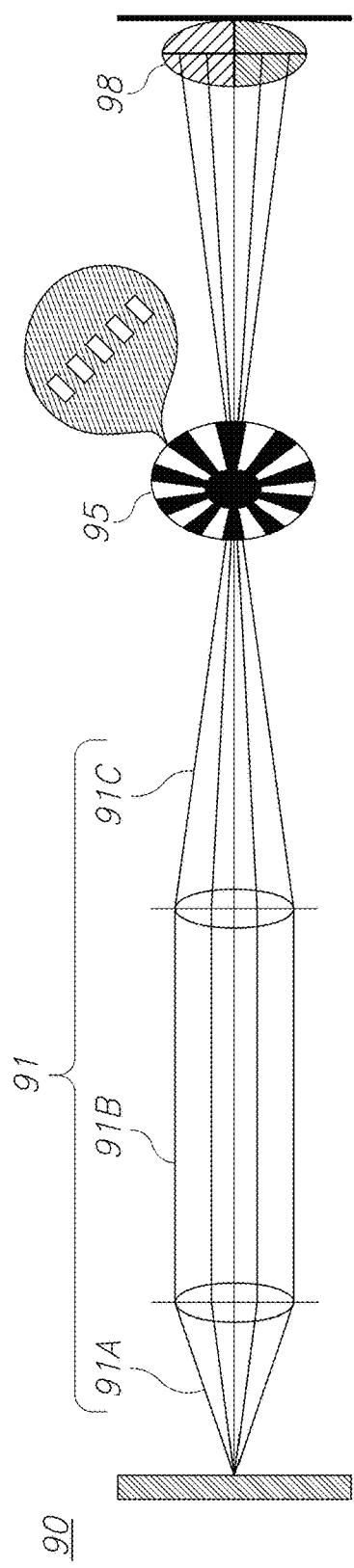
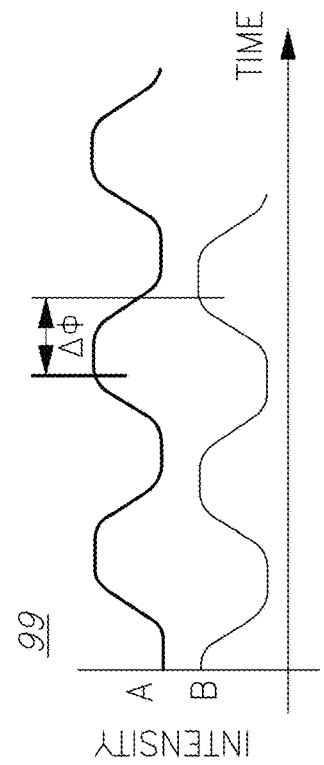
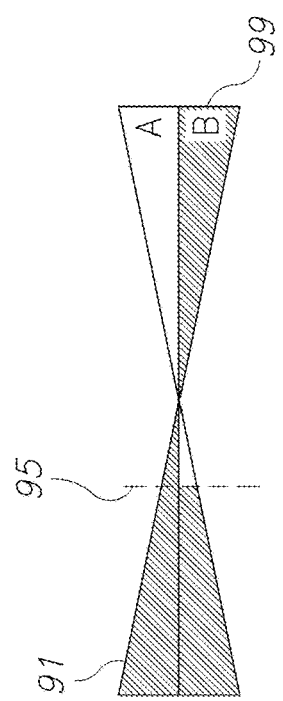
Figure 1A
PRIOR ART
Figure 1C
PRIOR ART
Figure 1B
PRIOR ART

200

210 — CONFIGURING A SPATIAL LIGHT MODULATOR (SLM) TO YIELD A CIRCUMFERENTIALLY SINUSOIDAL PATTERN

212 — CONFIGURING THE SLM AS A LCD OR A DMD THAT PRODUCE CIRCUMFERENTIALLY SINUSOIDAL PATTERN(S)

214 — CONFIGURING THE SLM AS AN OPTICAL CHOPPER WHEEL MADE OF A GLASS DISC WITH A CIRCUMFERENTIALLY SINUSOIDAL PATTERN

215 — DEPOSITING AND/OR ETCHING THE PATTERN ON THE GLASS DISC

217 — USING THE SLM IN A FOCUSING MODULE (E.G., OF A METROLOGY TOOL) TO YIELD A FOCUSING SIGNAL

220 — DETECTING THE FOCUSING SIGNAL BY A DIODE ARRAY

225 — POSITIONING THE DIODE ARRAY TO ALLOCATE A DISTINCT ANGULAR RANGE TO EACH DIODE AND/OR TO MEASURE AT LEAST TWO DIFFRACTION ORDERS SEPARATELY

Figure 5

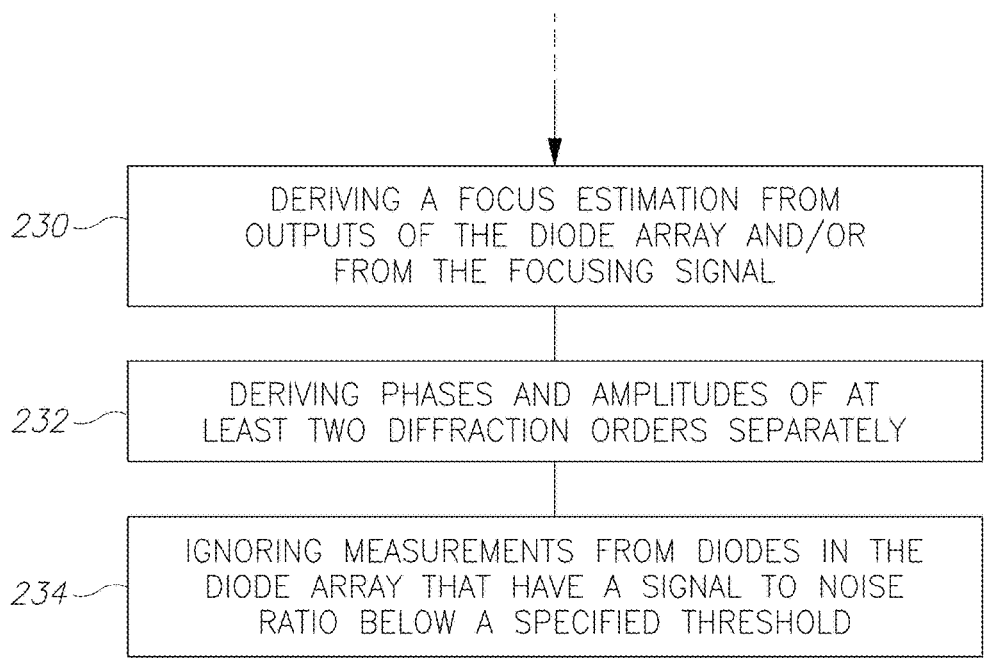
Figure 5 (cont. 1)

FOCUSING MODULES AND METHODS

CROSS REFERENCE TO RELATED APPLICATIONS

This application claims the benefit of U.S. Provisional Patent Application No. 62/090,336, filed on Dec. 10, 2014, which is incorporated herein by reference in its entirety.

BACKGROUND OF THE INVENTION

Technical Field

The present invention relates to the field of optical devices, and more particularly to autofocusing mechanisms.

Discussion of Related Art

FIGS. 1A-1C schematically illustrate an autofocus mechanism 90 according to the prior art. Illumination 91 from a target is passed through a rotating perforated optical chopping wheel 95 (typically made of metal such as aluminum or copper beryllium) having open and closed regions that generates on and off periods in the resulting signal, which is detected by a bi-cell detector 98 (FIG. 1A). The optical system that delivers illumination 91 to rotating optical chopping wheel 95 is configured to collimate (91B) focused illumination (91A), to cause out-of-focus illumination to converge or diverge when focused (91C) at the plane of rotating optical chopping wheel 95 (FIG. 1B). In case the target is out of focus, a phase forms between signals 99 in the two cells of detector 98 (FIG. 1C, denoted $\Delta\phi$) which is measured and used to estimate the level of defocus (typically $\Delta\phi$ is proportional to the distance between the target and the objective) in order to correct it in the tool using autofocus mechanism 90. The form of signals 99 is ideally a square wave, when the target is in focus (91A) and illumination 91B is collimated to be focused (91C) on wheel 95, due to the sharp transitions between open and closed regions of rotating optical chopping wheel 95, providing a sharp distinction between illumination transfer and illumination blocking.

SUMMARY OF THE INVENTION

The following is a simplified summary providing an initial understanding of the invention. The summary does not necessarily identify key elements nor limits the scope of the invention, but merely serves as an introduction to the following description.

One aspect of the present invention provides a focusing module comprising a spatial light modulator (SLM) configured to yield a circumferentially sinusoidal pattern.

These, additional, and/or other aspects and/or advantages of the present invention are set forth in the detailed description which follows; possibly inferable from the detailed description; and/or learnable by practice of the present invention.

The method and focusing module comprising a spatial light modulator (SLM) configured to yield a circumferentially sinusoidal pattern of the invention is shown in the following representative claims:
1. A focusing module comprising a spatial light modulator (SLM) configured to yield a circumferentially sinusoidal pattern.
2. The focusing module of claim 1, wherein the SLM is a liquid crystal display (LCD) or a digital micromirror device (DMD).
3. The focusing module of claim 1, wherein the SLM is an optical chopper wheel having a circumferentially sinusoidal pattern.
4. The focusing module of claim 3, wherein the optical chopper wheel comprises a glass disc.
5. The focusing module of claim 4, wherein the pattern is deposited and/or etched on the glass disc.
6. The focusing module of any one of claims 1 to 5, further comprising a diode array as detecting element.
7. The focusing module of claim 6, wherein the diode array is positioned to allocate each diode a distinct angular range.
8. The focusing module of claim 6, wherein the diode array is positioned to measure at least two diffraction orders separately.
9. The focusing module of any one of claims 6-8, further comprising a processing unit configured to derive a focus estimation from outputs of the diode array.
10. The focusing module of claim 9, wherein the processing unit is further configured to derive a phase and an amplitude of at least two diffraction orders separately.
11. The focusing module of claim 9, wherein the processing unit is further configured to ignore measurements from diodes in the diode array that have a signal to noise ratio below a specified threshold.
12. The focusing module of any one of claims 1 to 11, being part of a metrology tool.
13. The metrology tool that comprises the focusing module of claim 12.
14. A method comprising:
    configuring a SLM to yield a circumferentially sinusoidal pattern, wherein the SLM comprises a LCD, a DMD or an optical chopper wheel made of a glass disc with a circumferentially sinusoidal pattern, and using the SLM in a focusing module to yield a focusing signal.
15. The method of claim 14, wherein the SLM is an optical chopper wheel and the method further comprise depositing and/or etching the pattern on the glass disc.
16. The method of claim 14 or 15, further comprising detecting the focusing signal by a diode array.
17. The method of claim 16, further comprising positioning the diode array to allocate each diode a distinct angular range and/or to measure at least two diffraction orders separately.
18. The method of any one of claims 14-17, further comprising deriving a focus estimation from outputs of the diode array and/or from the focusing signal.
19. The method of claim 18, further comprising deriving a phase and an amplitude of at least two diffraction orders separately.
20. The method of claim 16 or 17, further comprising ignoring measurements from diodes in the diode array that have a signal to noise ratio below a specified threshold.
21. The focusing signal produced by the method of any one of claims 14-20.
22. A computer program product comprising a non-transitory computer readable storage medium having computer readable program embodied therewith and configured to carry out the deriving of claim 18 or 19.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 1A-1C schematically illustrate an autofocus mechanism, according to the prior art.

FIG. 5 is a high level flowchart illustrating a method, according to some embodiments of the invention.

DETAILED DESCRIPTION OF THE INVENTION

Figure 2:
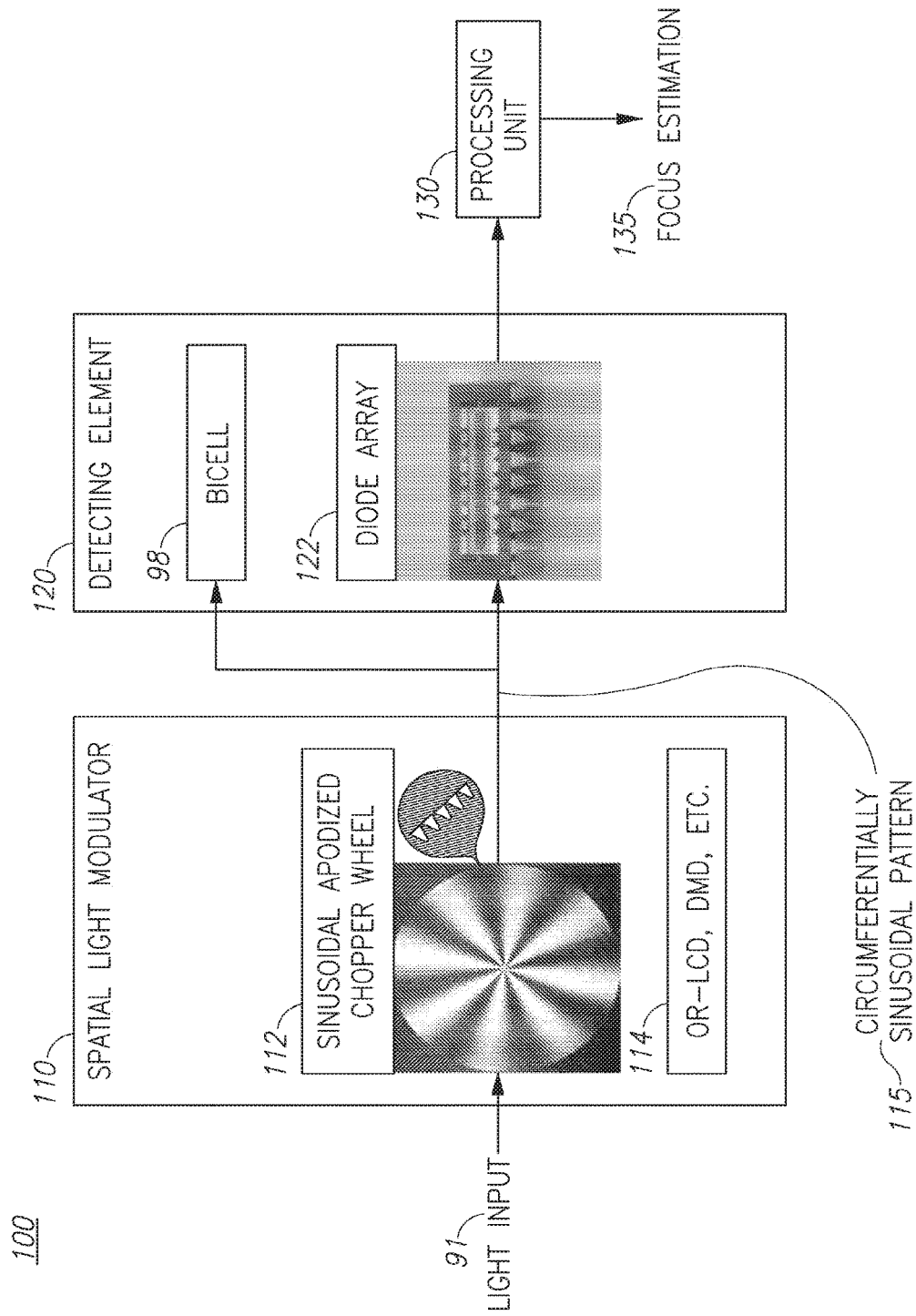
FIG. 2 is a high level schematic block diagram of a focusing module, according to some embodiments of the invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways. Also, it is to be understood that the phraseology and terminology employed herein is for the purpose of description and should not be regarded as limiting.

Focusing modules and methods are provided, which use a spatial light modulator (SLM) configured to yield a circumferentially sinusoidal pattern to derive focusing signals. For example, the SLM may comprise an optical chopper wheel made of a glass disc with a circumferentially sinusoidal pattern. The circumferentially sinusoidal pattern simplifies phase derivation from the focusing signal, providing a faster and more accurate estimation of defocusing. Signal detection may be carried out by a diode array that provides a more accurate signal faster, as well as a more differentiated analysis of the focusing signal than the one available by current technology.

FIG. 2 is a high level schematic block diagram of a focusing module 100, according to some embodiments of the invention. Focusing module 100, which may be part of a metrology tool (e.g., an imaging tool or a scatterometry tool), of a photolithography tool, or of any other tool with an autofocus system; and may be used to determine the focus position of the respective light source, comprises a spatial light modulator (SLM) 110 configured to yield a circumferentially sinusoidal pattern 115 instead of the crude rectangular pattern 99 provided by current modules 90 as presented in prior art FIGS. 1A-1C. Circumferentially sinusoidal pattern 115 comprises a sinusoidal pattern along at least one circumferential path with respect to the incident illumination.

SLM 110 may be implemented using various devices, such as a liquid crystal display (LCD), a digital micromirror device (DMD) or equivalent members. SLM 110 may be an optical chopper wheel 112 having a circumferentially sinusoidal pattern such as transparent and opaque (light and dark) regions that differ in the level of their transparency in a continuous, sinusoidal manner, as illustrated schematically in the image in FIG. 2. For example, optical chopper wheel 112 may comprise a glass disc with the sinusoidal pattern being deposited and/or etched on the glass disc to yield a circumferentially sinusoidal light pattern 115. It is emphasized that the sinusoidal pattern defines the transparency of optical chopper wheel 112 along each circumference, that is the degree of transparency changes sinusoidally along the circumference (in the tangential direction). It is noted that the disclosure may be applied to single or double size choppers.

Focusing module 100 may further comprise a bicell 98 or a diode array 122 as detecting element 120, the latter improving upon the former by providing multiple outputs that may be used to derive more information and/or derive the focusing information quicker. For example, diode array 122 may comprise a CMOS (complementary metal-oxide semiconductor array) or a CCD (charge-coupled device).

Focusing module 100 may be part of an improved autofocus system, based on sine-apodized neutral density wheel 112 and diode array 122.

Diode array 122 may be positioned to allocate a distinct angular range to each diode in array 122, i.e., to position diode array 122 radially with respect to optical chopper wheel 112 and pattern 115. Such positioning provides different illumination characteristics for different diodes, as each diode receives the signal from a different radial distance and different circumferential length along wheel 112, so that defocused illumination may result in typical differences between signals detected by different diodes. The diodes in the array provide detection of phase differences between the diodes, and increasing the number of diode may enable improving the signal resolution and the accuracy of the phase signal detection.

Diodes in array 122 which have a low SNR (signal to noise ratio) may be omitted from the defocusing measurements by processing unit 130, e.g., in case of extreme defocusing, a part of the aperture may be blocked, and processing unit 130 may be configured to identify the blocking and ignore readings from respective diodes that face the blocked region(s). Diode array 122 may be positioned to measure at least two diffraction orders of the illumination through wheel 112, separately, to provide phase and amplitude measurements of each order. Diode array 122 may be configured to extend over a larger area (with respect to current bicells 98) and be used to measure more than one diffraction order of the signal, e.g., measure at least one component of the first diffraction order in addition to the zeroth diffraction order. The measurements of the amplitude and phase of the first diffraction order may further enhance the accuracy of the focus measurement.

Focusing module 100 may further comprise a processing unit 130 configured to derive a focus estimation 135 from outputs of detecting element 120, particularly from outputs of diode array 122. For example, processing unit 130 may be configured to derive a phase and an amplitude of at least two diffraction orders separately. In certain embodiments, processing unit 130 may be configured to ignore measurements from diodes in diode array 122 that have a signal to noise ratio below a specified threshold.

Figure 3B:
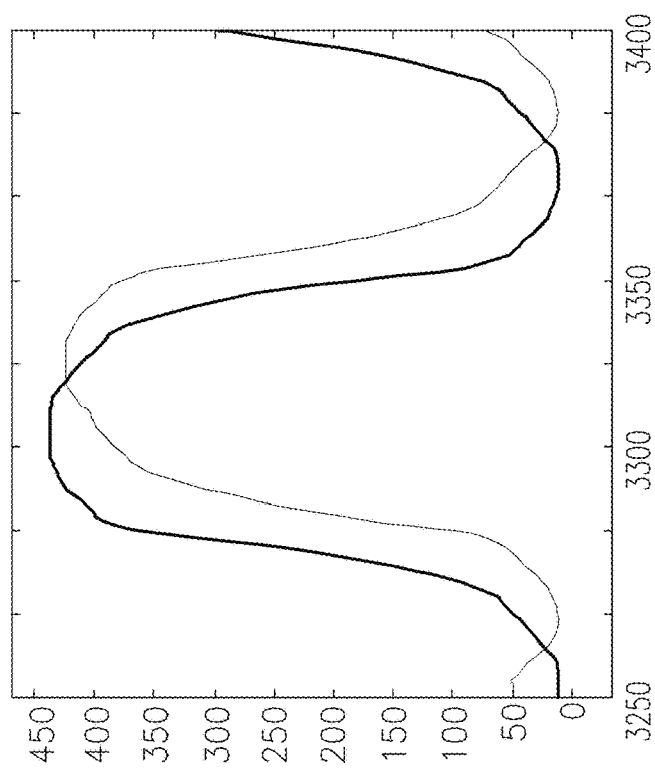
FIGS. 3A and 3B illustrate, respectively, examples for a prior art signal and a circumferentially sinusoidal pattern, according to some embodiments of the invention.
Figure 3A:
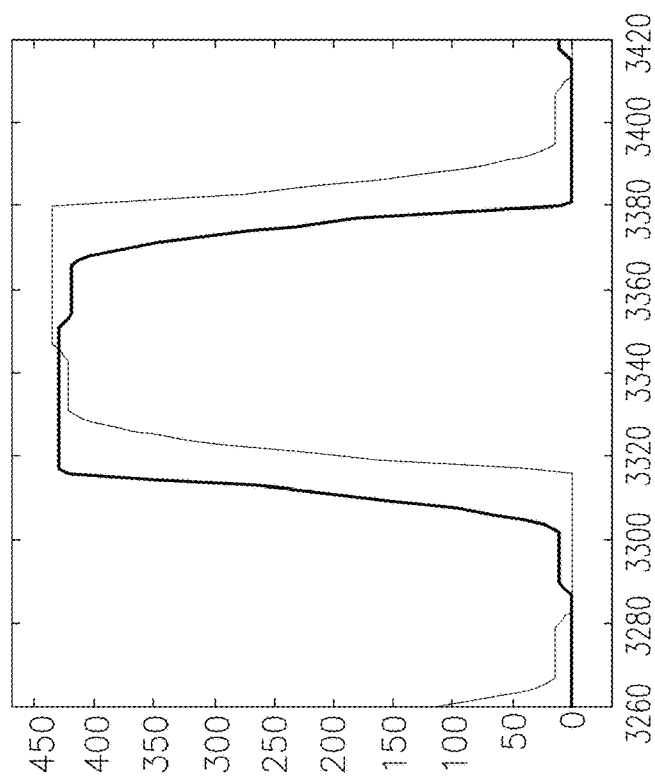

FIGS. 3A and 3B illustrate, respectively, examples for a prior art signal 99 and circumferentially sinusoidal pattern 115 according to some embodiments of the invention. Both signals are simulated assuming use of bicell detector 98 and a 2μ defocus. The x axis indicates time in nanosecond units and the y axis indicates intensity in arbitrary units. Prior art signal 99 is a multi-harmonic signal due to the form of openings in chopper 95. Signal processing is required to derive the first harmonic to enable measuring multiple periods of signal 99 to derive phase Δφ therefrom. Furthermore, noise (visible as the jumps that are denoted by the arrows in FIG. 3A) interferes significantly in the signal processing and reduces the accuracy of the results. In contrast, circumferentially sinusoidal pattern 115 provides one harmonic directly, which enables simple, faster and more accurate derivation of the phase. The phase may be derived from a smaller number of cycles that in the prior art, possibly even using a single period or less, as the signal represents the first harmonic in the first place. Phase derivation using circumferentially sinusoidal pattern 115 is also less susceptible to noise, and derivation of higher harmonics if needed is also simpler.

Figure 4:
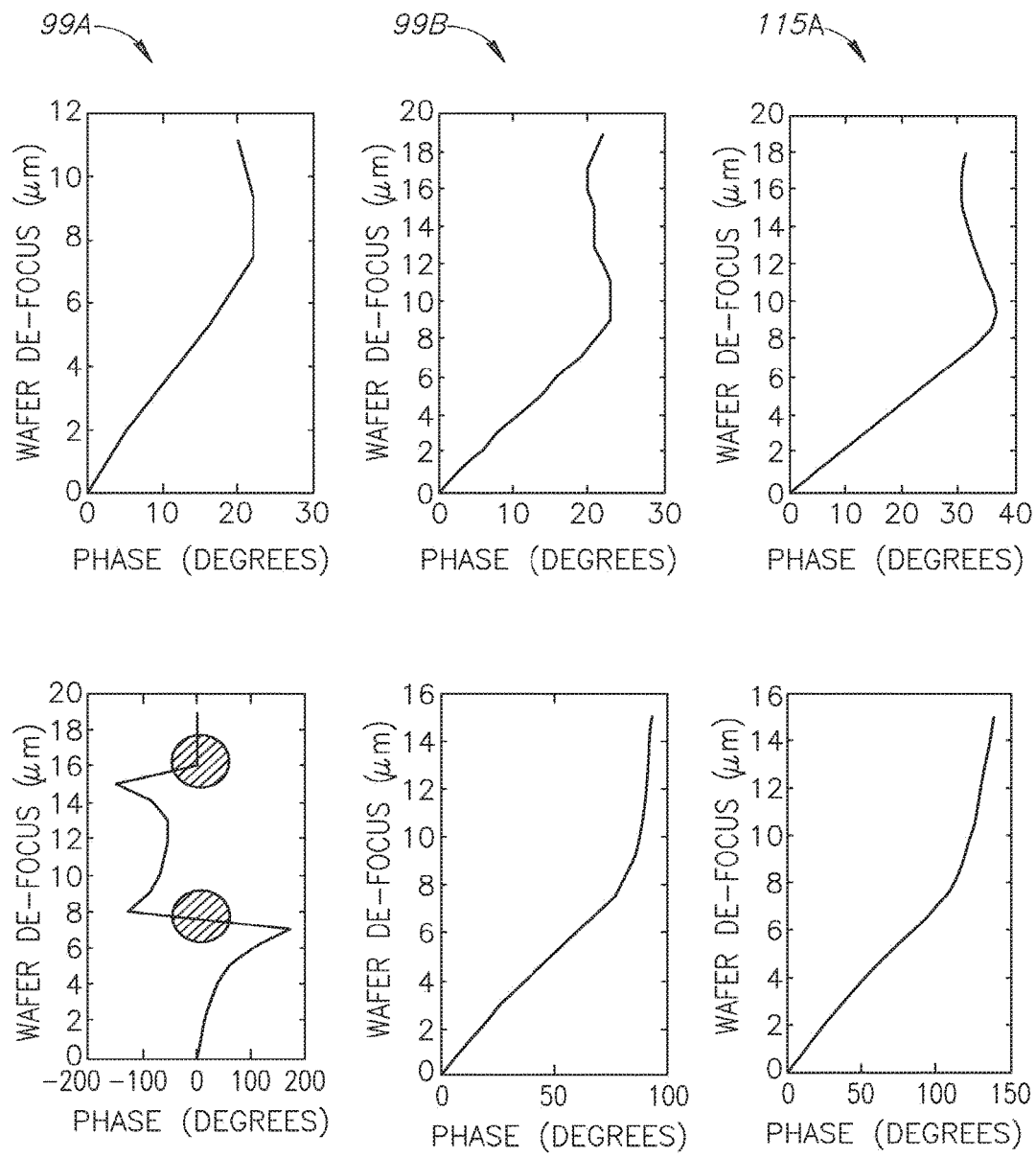
FIG. 4 illustrates examples of simulated phase plots for prior art signals and for the circumferentially sinusoidal pattern, according to some embodiments of the invention.

FIG. 4 illustrates examples of simulated phase plots for prior art signals 99A, 99B and for circumferentially sinusoidal pattern 115A according to some embodiments of the invention. Each plot is presented for a "focus assist" illumination (top diagram) and for quadruple illumination (bottom diagram). (Both illumination patterns comprise passing a Gaussian illumination through a mask that improves the signals received at the respective detector (diode); the mask may comprise e.g., circular or elliptical openings, with or without a central opening—"focus assist" illumination comprises five circular openings with a central opening, quadruple illumination comprises four elliptical openings without a central opening.)

FIG. 4 illustrates the higher level of linearity between the degree of defocusing and the resulting phase and the greater sensitivity (larger phase variation for a given defocusing level) of phase plots 115A derived from circumferentially sinusoidal pattern 115 with respect to phase plots derived from prior art signals. For example, using quadruple illuminations, prior art 99A is linear only for defocusing up to 4μ and exhibits a low sensitivity to the exact defocusing value (phase changes 0° to ca. 30° over 4μ of defocusing), and is not monotonous and unreliable for defocusing larger than ca. 6μ, while circumferentially sinusoidal pattern 115 provides linear dependency up to ca. 8μ, higher sensitivity (phase changes 0° to ca. 60° over the first 4μ of defocusing), and is monotonous up to defocusing of ca. 14μ. Moreover, the present invention provides a phase plot that, being monotonous over a large range, has a single phase zero point that provides a unique focus value, in contrast to prior art phase plots which may yield more than one phase zero points, as illustrated in bottom 99A illustration by the hatched circles.

In the example of SLM 110 being the optical chopper wheel 112, such as a patterned glass disc, additional advantages over prior art perforated metal disc chopper 95 arise, namely a reduction in air turbulence, friction and wobbling of the disc, all of which enhance the stability of the mechanism and reduce the level of noise in the measurement. The thickness of glass disc wheel 112 may be made very small.

Disadvantageously in the prior art, phase is not a monotonic function of defocus, and depends strongly on aperture intensity function (see FIG. 4). Bicell signal shows step-like behavior, which causes reduced phase precision (see FIG. 3A). Each bicell half averages the entire angular space in its collection and therefore produces only an average phase and reduces the accuracy of the measurement (see FIG. 1B). As a result, in the prior art typically only uniform beams from single field point can be measured precisely. As illustrated above, proposed focusing modules 100 overcome some or all of these disadvantages.

Advantageously, focusing module 100 provides a greater focus range and yields a more accurate φ(z) (phase to defocusing distance) function that provides quicker focusing, possibly without need for a z scanning due to the phase plot linearity, as illustrated in FIG. 4. Focusing module 100 may produce quicker feedback, improved robustness and faster autofocus for optical systems, without or with lesser dependency on the pupil and field intensity distributions.

FIG. 5 is a high level flowchart illustrating a method 200, according to some embodiments of the invention. Method 200 may be at least partially implemented by at least one computer processor, e.g., in a metrology module. Certain embodiments comprise computer program products comprising a computer readable storage medium having a computer readable program embodied therewith and configured to carry out all of the relevant stages of method 200, as well as the focusing signal(s) produced by any variation of method 200.

Method 200 comprises configuring a spatial light modulator (SLM) to yield a circumferentially sinusoidal pattern (stage 210), wherein the SLM may comprise a LCD, a DMD or an optical chopper wheel made of a glass disc with a circumferentially sinusoidal pattern—any of which are configured to produce a circumferentially sinusoidal pattern (stage 212), and using the SLM in a focusing module (e.g., of a metrology tool) to yield a focusing signal (stage 217).

For example, the SLM may be configured as an optical chopper wheel made of a glass disc with a circumferentially sinusoidal pattern (stage 214) and method 200 may further comprise depositing and/or etching the pattern on the glass disc (stage 215).

Method 200 may further comprise detecting the focusing signal by a diode array (stage 220), possibly positioning the diode array to allocate each diode a distinct angular range and/or to measure at least two diffraction orders separately (stage 225).

Method 200 may further comprise deriving a focus estimation from outputs of the diode array and/or from the focusing signal (stage 230), for example, deriving a phase and an amplitude of at least two diffraction orders separately (stage 232). Optionally, method 200 may comprise ignoring measurements from diodes in the diode array that have a signal to noise ratio below a specified threshold (stage 234), e.g., in case of a severe defocusing that renders some of the diodes in the array irrelevant for the phase derivation.

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A focusing system comprising:
   a spatial light modulator (SLM) configured to yield a circumferentially sinusoidal illumination pattern;
   a detecting element, wherein the detecting element comprises a diode array, wherein the diode array is positioned such that a first diode of the diode array receives a first portion of the circumferentially sinusoidal illumination pattern having a first set of illumination characteristics and an additional diode of the diode array receives an additional portion of the circumferentially sinusoidal illumination pattern having an additional set of illumination characteristics different from the first set of illumination characteristics; and
   a processing unit, wherein the processing unit is configured to derive a focus estimation from one or more outputs of the diode array.

2. The focusing system of claim 1, wherein the SLM comprises at least one of a liquid crystal display (LCD) or a digital micromirror device (DMD).

3. The focusing system of claim 1, wherein the SLM is an apodized wheel having a circumferentially sinusoidal pattern.

4. The focusing system of claim 3, wherein the apodized wheel comprises a glass disc.

5. The focusing system of claim 4, wherein the sinusoidal pattern is formed on the glass disc via at least one of deposition or etching.

6. The focusing system of claim 1, wherein the diode array is positioned to allocate each diode a distinct angular range.

7. The focusing system of claim 1, wherein the diode array is positioned to measure at least two diffraction orders separately.

8. The focusing system of claim 1, wherein the processing unit is further configured to derive a phase and an amplitude of at least two diffraction orders separately.

9. The focusing system of claim 1, wherein the processing unit is further configured to negate measurements from one or more diodes in the diode array that have a signal-to-noise ratio below a specified threshold.

10. A metrology tool comprising:
    a focusing module comprising:
    a spatial light modulator (SLM) configured to produce a circumferentially sinusoidal illumination pattern;
    a detecting element, wherein the detecting element comprises a diode array, wherein the diode array is positioned such that a first diode of the diode array receives a first portion of the circumferentially sinusoidal illumination pattern having a first set of illumination characteristics and an additional diode of the diode array receives an additional portion of the circumferentially sinusoidal illumination pattern having an additional set of illumination characteristics different from the first set of illumination characteristics; and
    a processing unit.

* * * * *